US009665420B2

(12) United States Patent
Jilani

(10) Patent No.: US 9,665,420 B2
(45) Date of Patent: May 30, 2017

(54) CAUSAL ENGINE AND CORRELATION ENGINE BASED LOG ANALYZER

(71) Applicant: CA, Inc., New York, NY (US)

(72) Inventor: Abdul K. Jilani, Hyderabad (IN)

(73) Assignee: CA, Inc., Islandia, NY (US)

( * ) Notice: Subject to any disclaimer, the term of this patent is extended or adjusted under 35 U.S.C. 154(b) by 20 days.

(21) Appl. No.: 14/815,112

(22) Filed: Jul. 31, 2015

(65) Prior Publication Data

US 2017/0031742 A1 Feb. 2, 2017

(51) Int. Cl.
*G06F 11/00* (2006.01)
*G06F 11/07* (2006.01)
*H04L 12/24* (2006.01)

(52) U.S. Cl.
CPC ........ *G06F 11/079* (2013.01); *G06F 11/0709* (2013.01); *G06F 11/0751* (2013.01); *G06F 11/0787* (2013.01); *H04L 41/069* (2013.01); *H04L 41/0631* (2013.01)

(58) Field of Classification Search
USPC .......................................................... 714/26
See application file for complete search history.

(56) References Cited

U.S. PATENT DOCUMENTS

| 7,770,072 B2* | 8/2010 | Handley | ............. | G06F 11/0733 702/183 |
| 7,774,655 B2* | 8/2010 | Virdhagriswaran | | G06F 11/0733 700/110 |
| 8,380,607 B2 | 2/2013 | Bollen et al. | | |
| 8,655,830 B2 | 2/2014 | Mackay | | |
| 2015/0229546 A1* | 8/2015 | Somaiya | ............... | H04L 43/045 715/736 |

OTHER PUBLICATIONS

Splunk Inc. Printed Jul. 22, 2015. "Splunk Enterprise." http://www.splunk.com/en_us/products/splunk-enterprise.html. 8 pages.
Elasticsearch BV. Printed Jul. 22, 2015. "Kibana." https://www.elastic.co/products/kibana. 4 pages.
Elasticsearch Bv. Printed Jul. 22, 2015. "Logstash." https://www.elastic.co/products/logstash. 3 pages.

* cited by examiner

*Primary Examiner* — Sarai Butler
(74) *Attorney, Agent, or Firm* — Stevens & Showalter, LLP

(57) ABSTRACT

A system for determining a root cause of an issue in an enterprise comprises a log reader, a time-series converter, a correlator, and a causal engine. The log reader receives data logs as unstructured data from a plurality of assets in the enterprise and converts the unstructured data to structured data. The time-series converter identifies a time scale for each data log, determines a common time scale based on the identified time scales, and converts the data logs to the common time scaled time series. Further, the correlator filters out data logs that do not contribute to a causal analysis to determine the root cause of the problem in the enterprise. Moreover, the causal engine performs the causal analysis using the data logs that were not filtered out to determine the root cause of the problem in the enterprise.

20 Claims, 4 Drawing Sheets

CAUSAL ENGINE AND CORRELATION ENGINE BASED LOG ANALYZER

BACKGROUND

Various aspects of the present disclosure relate generally to analysis of data logs and in particular to data log analysis of a heterogeneous network system. Thus, the present disclosure relates to an improvement in the technological field of heterogeneous computer network analysis.

A computer network is a group of assets such as routers, switches, servers, etc. that are in communication with each other. A router is a networking asset that forwards data packets between networks or sub-networks within one network; usually routers couple to other routers or to switches. On the other hand, a switch routes data from a source (e.g., a router, a server) to one or more entities within the network.

In computer networks, a number of issues arise, including traffic overload on assets within the network, network faults, etc. If an issue does arise in the network where one or more of the assets are unreachable by other assets in the network, a network management system will try to identify the root cause of the problem so the problem may be fixed. Once the root cause is known, the network administrator will try to recover from the problem.

Most assets, if not all assets, in the network keep track of events, data, and an overall health of the asset in a data log. The network management system can read the logs of the assets and determine a root cause for an issue.

BRIEF SUMMARY

According to aspects of the present disclosure, a system for determining a root cause of an issue in an enterprise comprises a log reader, a time-series converter, a correlator, and a causal engine. The log reader receives data logs as unstructured data from a plurality of assets in the enterprise and converts the unstructured data to structured data. The time-series converter identifies a time scale for each data log, determines a common time scale based on the identified time scales, and converts the data logs to the common time scaled time series. Further, the correlator filters out data logs that do not contribute to a causal analysis to determine the root cause of the problem in the enterprise. Moreover, the causal engine performs the causal analysis using the data logs that were not filtered out to determine the root cause of the problem in the enterprise.

According to further aspects of the present disclosure, a process for determining a root cause of a problem in an enterprise comprises receiving data logs as unstructured data from a plurality of assets in the enterprise. Then, the unstructured data is converted to structured data, and a time scale is identified for each time log. Based on the identified time scales, a common time scale is determined, and the structured data is converted to the common time scale. Any data logs that do not contribute to a causal analysis to determine the root cause of the problem in the enterprise are filtered out, and causal analysis is performed using the data logs that were not filtered out to determine the root cause of the problem in the enterprise.

DETAILED DESCRIPTION

According to aspects of the present disclosure, a system is disclosed that takes a holistic approach to determining a root cause to issues (e.g., failures, poor performance, etc.) that may occur within a network. The system disclosed is especially useful in heterogeneous networks, where assets within the network are made from different manufacturers or keep data logs with varying time scales. Basically, a log reader receives data logs from the assets within the network and adds preliminary structure to the data logs. A time-series converter converts the structured log data into time series and normalizes the time series to a common time scale. A correlation engine applies an algorithm to find correlated assets based on the converted data logs. A causal engine finds any root causes of any issues with the network based on the correlated data logs, and the root causes are transmitted to a user (e.g., through a graphical user interface).

Figure 1:
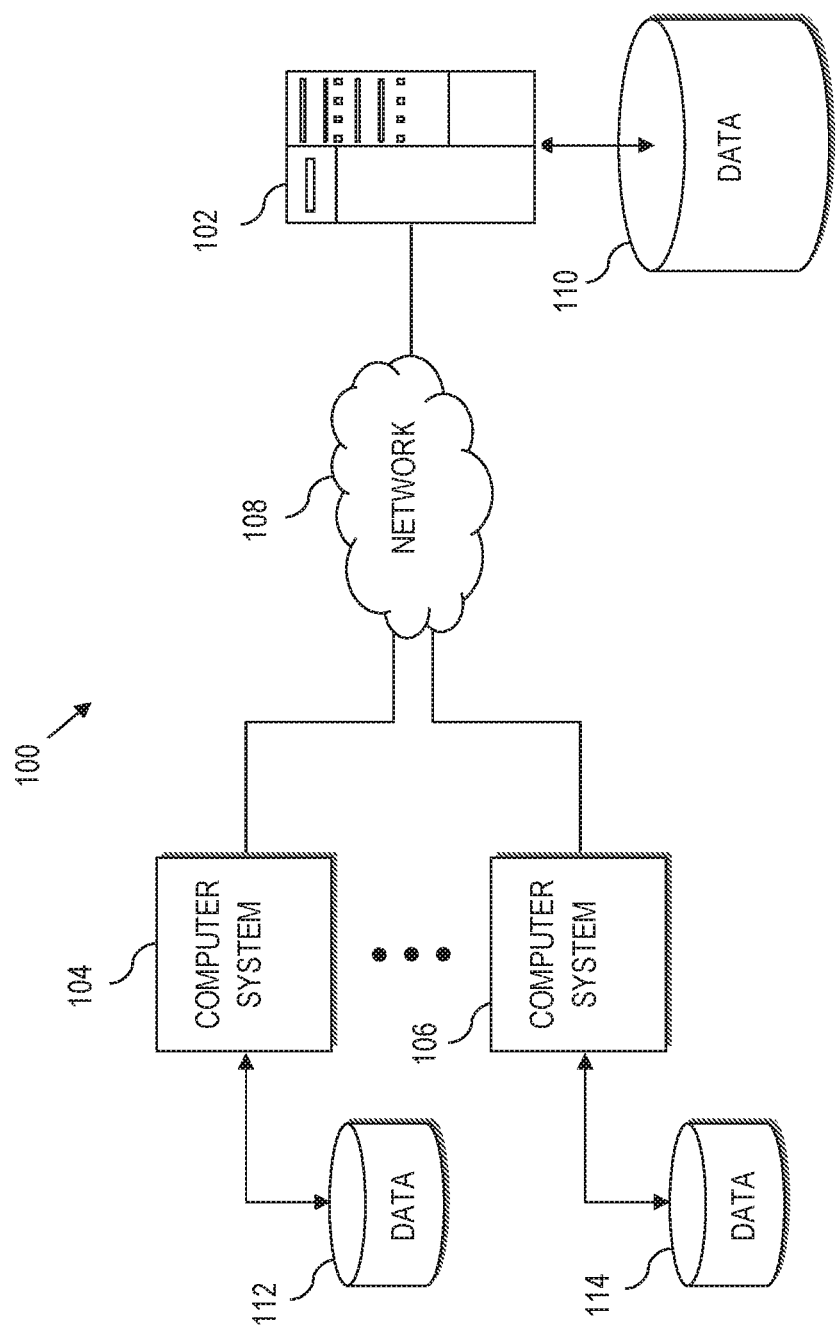
FIG. 1 is a block diagram of a computer network, according to various aspects of the present disclosure.

Referring to drawings and in particular FIG. 1, a network system 100 is illustrated according to aspects of the present disclosure herein. Generally, a processing device designated as a first machine 102 communicates with one or more remote processing devices, e.g., a second machine 104 and a third machine 106, across a network 108. The second machine 104 and third machine 106 are illustrated solely for purposes of simplified explanation. In practice, one or more remote devices may communicate with the first machine 102. The first machine 102 may comprise a mainframe computer, server computer, or other processing device that is capable of responding to data transfer requests, as will be described in greater detail herein. In this regard, the first machine 102 has access to storage 110 (e.g., any form of storage, including disk(s), network addressed storage (NAS), file server(s), a cloud based storage, or other structure where data can be retrieved).

The second machine 104 and third machine 106 may each comprise any processing device that is capable of communicating over the network 108 to request and/or receive data from the first machine 102. For instance, typical processing devices include server computers, personal computers, notebook computers, and tablets. The second machine 104 or third machine 106 may also comprise by way of example, transactional systems, purpose-driven appliances, cellular devices including smart telephones, and special purpose computing devices.

For purposes of discussion herein, the second machine 104 has access to storage 112 where data received from the first machine 102 is to be stored. Likewise, the third machine 106 has access to storage 114 where data received from the first machine 102 is to be stored.

The network 108 provides communication links between the various processing devices, e.g., the first machine 102, the second machine 104, and the third machine 106. Accordingly, the network 108 may be supported by networking components such as routers, switches, hubs, firewalls, network interfaces, wired or wireless communication links and corresponding interconnections, cellular stations and corresponding cellular conversion technologies, e.g., to convert between cellular and TCP/IP, etc. Such devices are not shown for purposes of clarity. Moreover, the network 108 may comprise connections using one or more intranets, extranets, local area networks (LAN), wide area networks (WAN), wireless networks (WIFI), the Internet, including the world wide web, a cloud, and/or other arrangements for enabling communication between the processing devices, in either real time or otherwise, e.g., via time shifting, batch processing, etc.

The network system 100 is shown by way of illustration, and not by way of limitation, as a computing environment in which various aspects of the present disclosure may be practiced. Other configurations may alternatively be implemented. All of the devices discussed above in reference to the network (e.g., machines, routers, switches, hubs, etc.) are entities within the network.

Figure 2:
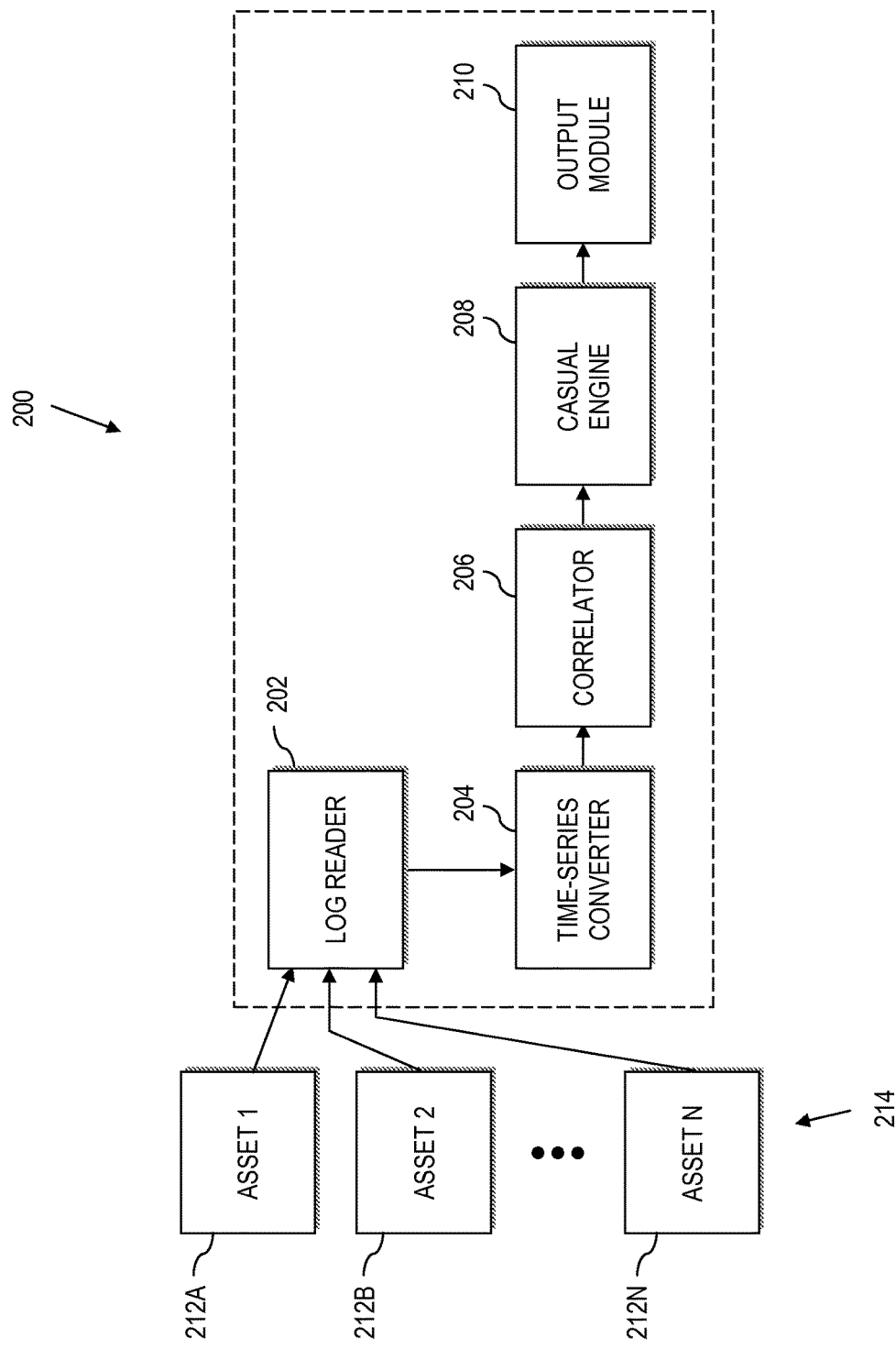
FIG. 2 is a block diagram for a system to determine a root cause of an issue within an enterprise using correlation and causal analysis, according to various aspects of the present disclosure.

FIG. 2 illustrates a system 200 that may be used to perform a root cause analysis for a heterogeneous network (i.e., a network with assets from different vendors, assets that keep differently scaled data logs, different types of assets (e.g., hardware, software, data bases, etc.), assets with different operating systems, or combinations thereof). The system includes a log reader 202, a time-series converter 204, a correlator 206, a causal engine 208, and an output module 210.

The log reader 202 receives data logs (usually in an unstructured format) from assets 212A-N in a heterogeneous network 214 and may add structure to the data logs. For example, the log reader 202 may identify information such as source names (which indicate which asset 212 supplied the data log), timestamps (which indicate a time scale of events within the data log), etc. As another example, columns like error counts, warning counts, alert counts, processor unit usage, memory usage, etc. may be added to the structure of the data logs, and these counts may be used in a correlation (described below). Once a piece of information has been identified, the log reader 202 may tag that piece of information. Also, the log reader may append the source name of the asset to the data log if the log does not already include the source name. In other words, using the techniques described above, the log reader 202 converts the unstructured log data into structured log data.

The time-series converter 204 creates a normalized time series for each data log. To do so, the time-series converter identifies a time scale for each data log (which is easily done because the log reader 202 has identified and tagged the events within the data logs). Once all of the time scales have been identified, the time-series converter 204 determines a common time scale of the data logs based on the identified time scales and converts the time scales of each of the data logs to the common time scale. If a specific data log is already at the common time scale, then the conversion may be to leave the data log at its time scale. The time-series converter may convert the data logs to the common time scale as the logs come in, periodically over time, or after an issue has been detected within the enterprise.

For example, the time-series converter 204 may determine which time scale of the individual time logs has the greatest time between samples (i.e., the largest time scale and lowest sampling rate). Then, the time scales are converted to the largest time scale by shifting any data within the logs that occur at times other than the largest time scale to a next point coinciding to the common time scale or removing the timestamps not coinciding with the common time scale. For example, if a data log tallies a number of errors, warnings, alerts, and critical information that occurred since the last timestamp and has an original time scale of one minute but the common time scale is every ten minutes, then the timestamps for 3:01-3:09 are removed and added to the total at 3:10.

As another example, the time-series converter 204 determines which time scale of the individual time logs has the least time between samples (i.e., the smallest time scale and highest sampling rate). Then, the time scales are converted to the smallest time scale by adding timestamps with no events or repeating previous data states. For example, if a data log tallies a number of errors, warnings, alerts, and critical information that occurred since the last timestamp and has an original time scale of ten minutes but the common time scale is every one minute, then timestamps are added at 3:01, 3:02, 3:03 . . . 3:09 where the newly added timestamps do not include any events. Other methods may be used to determine a common time scale and to convert the data logs to the common time scale that are not discussed here. Basically, the time-series converter pivots the data logs into a time dimension that may be read by the correlator 206.

The correlator 206 receives the data logs set to a common time scale and reviews the data of the data logs (e.g., errors, warnings, critical information, alerts, etc.) to find possible relationships between the assets within the network concerning the issue at hand. In a heterogeneous system with hundreds of assets, this task is unthinkable for a human to perform. Basically, the correlator 206 collects all of the data logs converted to the common time scale into a list. Starting with any data log in the list, the correlator 206 compares this data log with every other data log in the list to find correlation coefficients for that data log. For example, the correlator 206 may find a correlation between columns added to the data: error count, warning count, processor usage, memory usage between the data logs. The correlation may be specific-column-to-specific-column (e.g., error count of one data log compared to error count of a second data log), the correlation may be across columns (e.g., error count of one data log may be compared to processor usage, warning count, and memory usage of another log), or both. Thus, the correlation process looks for trends and accounts for time shifts between data points and between data logs. This process is repeated for every data log in the list until every data log has been assigned correlation coefficients.

The data logs with a correlation coefficient below a certain threshold are filtered out, and only the subset of data logs with a high correlation coefficient are used by the causal engine 208. For example, correlation coefficients may range from −1 to 1, and any data log with a negative correlation coefficient may be filtered out. As another example, if there are three clusters of correlation coefficients (all ranging between −1 and 1) around −0.5, 0 and 0.5, then anything below 0.25 may be filtered out. Thus, the threshold may be predetermined or may be determined through a statistical analysis (e.g., a clustering analysis). This correlation reduces a hypothesis space for the causal engine 208, because fewer data logs are actually run through causal analysis. However, the data logs that are used include the most useful information to determining the root cause of the issue with the heterogeneous network 214.

The causal engine 208 then uses the subset of data logs that were not filtered out to perform a causal analysis to determine the root cause(s) of the issue with the network. The causal engine 208 imports the subset of data logs from the correlator 206 and implements a causal analysis. For example, the causal engine 208 may use unsupervised learning (e.g., Granger causal tests, cluster analysis, etc.) to determine the root cause(s). Once the root cause(s) is found, an output module 210 may send the root cause(s) to a graphical user interface (GUI) for display to a user.

The system 200 described above can be used in an enterprise (e.g., a heterogeneous network) to determine a root cause for issues within the network. Through the correlation and causal analysis described above, the whole heterogeneous network may be seen as a whole unit for root cause analysis. Thus, the system can find a root cause of an issue by using correlation and causal analysis together. Further, the correlation described above (e.g., relation data mining) can uncover complex relationships between assets and provide a richer, deeper root cause analysis for asset and network issues.

Figure 3:
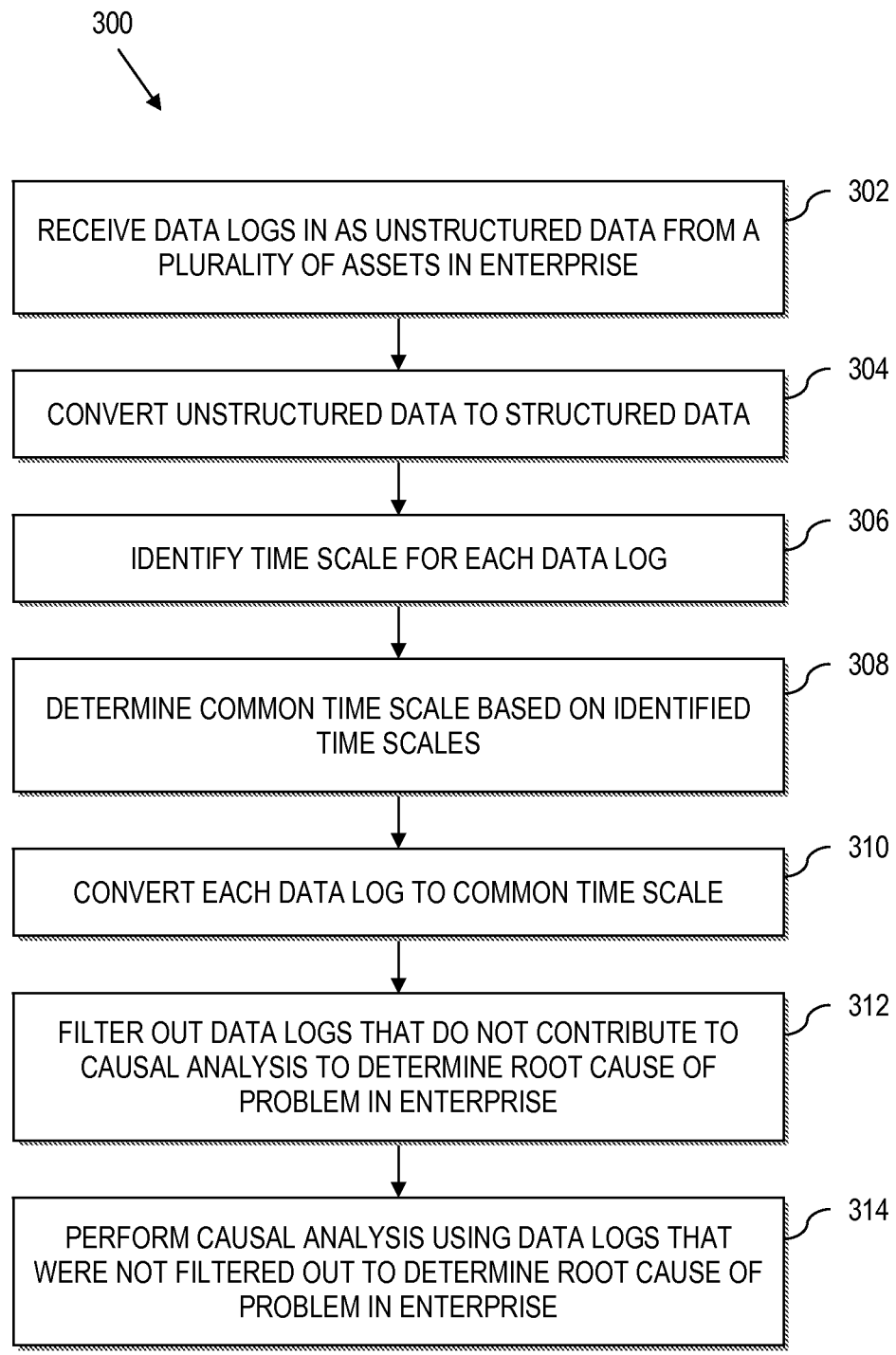
FIG. 3 is a flow chart illustrating a method for determining a root cause of an issue within an enterprise using correlation and causal analysis, according to various aspects of the present disclosure.

Referring now to FIG. 3, a method 300 for determining a root cause of an issue with a heterogeneous network is presented. In this regard, the method 300 may be implemented on computer-readable hardware that stores machine-executable program code, where the program code instructs a processor to implement the described method. The method 300 may also be executed by a processor coupled to memory, where the processor is programmed by program code stored in the memory, to perform the described method.

At 302, data logs are received as unstructured data from a plurality of assets in an enterprise. For example, the enterprise may be a heterogeneous network of over one hundred assets, and data logs indicating errors, warnings, critical information, and alerts are received.

At 304, the unstructured data is converted to structured data. For example, the assets that send each individual data log may be identified and appended to the data log. As another example, the data log may be searched to identify timestamps that indicate a time scale of the data log. These time stamps may then be tagged for future analysis.

At 306, a time scale is identified for each data log. For example, the tagged timestamps may be read for each data log to determine the time scale of each data log. At 308, a common time scale is determined based on the identified time scales. For example, it a greatest time scale may be determined by identifying which time scale of the individual time logs has the greatest time between samples (i.e., the largest time scale and lowest sampling rate). Then at 310, the time scales of the data logs are converted to the largest time scale by shifting any data within the logs that occur at times other than the largest time scale to a next point coinciding to the common time scale or removing the timestamps not coinciding with the common time scale. For example, if a data log tallies a number of errors, warnings, alerts, and critical information that occurred since the last timestamp and has an original time scale of one minute but the common time scale is every ten minutes, then the timestamps for 8:01-8:09 are removed and added to the total at 8:10.

At 312, any data logs that do not contribute significantly to a causal analysis are filtered out of the set of data logs. For example a list of all of the data logs converted to the common time scale may be compiled into a list. Starting with any data log in the list, the correlator 206 compares this data log with every other data log in the list to find a correlation coefficient for that data log. This process is repeated for every data log in the list until every data log has been assigned a correlation coefficient. The data logs with a correlation coefficient below a certain threshold are filtered out, and only the subset of data logs with a high correlation coefficient are used for causal analysis. This correlation reduces a hypothesis space for the causal analysis, because fewer data logs are actually run through the causal analysis. However, the data logs that are used include the most useful information to determining the root cause of the issue with the enterprise.

At 314, a causal analysis is performed on the subset of data logs that were not filtered out to determine a root cause for an issue in the enterprise. For example, a Granger causation test may be performed on the subset of remaining data logs to find the root cause.

The method 300 described above can be used in an enterprise (e.g., a heterogeneous network) to determine a root cause analysis for issues within the network. Through the correlation and causal analysis described above, the whole heterogeneous network may be seen as a whole unit for root cause analysis. Thus, the system can find a root cause of an issue by using correlation and causal analysis together. Further, the correlation described above (e.g., relation data mining) can uncover complex relationships between assets and provide a richer, deeper root cause analysis for asset and network issues.

In an example of the system and process of FIGS. 2-3, an enterprise includes three-hundred assets of various types (e.g., servers, databases, exchanges, routers, clients, software, etc.) by various vendors. Thus, the enterprise is a heterogeneous enterprise. As the assets of the enterprise run, they send logs to a log reader (202 of FIG. 2), which gives structure to the data logs by marking each log with the name of the asset that sent the log. Further, the log reader identifies any timestamps within the logs.

A time-series converter (204, FIG. 2) converts the logs to a time-series. To do so, the time-series converter uses the timestamps within the data logs to determine a time scale for each data log. For example, if the data log for Asset_1 includes events only at ten minute increments, then the time scale for Asset_1 would be ten minutes. If Asset_2 includes events every minute (or sporadically but always falling on a minute mark other than ten-minute increments), then the time scale for the log of Asset_2 is one minute.

Further, the time-scale converter converts the time scales of each log to a common time scale. In this example, the largest time between samples is used as the common time scale, which is a ten-minute time scale. Using the two data logs above, the data log for Asset_1 is left alone as it is already at a ten-minute time scale. However, the log for Asset_2 is at a one-minute time scale, so the log for Asset_2 must be adjusted. In this case, there are two alerts at 1:01, one alert at 1:04, two alerts at 1:09, and one alert at 1:10. Thus, after conversion to the common time scale, there are six alerts at 1:10 and the timestamps at 1:10, 1:04, and 1:09 are removed. This is done for every ten minutes of the data log for Asset_2. The time-series converter converts the data logs for the rest of the assets in the enterprise to the common time scale.

Once an issue occurs in the enterprise, a correlator (206, FIG. 2) finds correlation coefficients for each data log on the common time scale. To do so, the correlator compares each data log with each other data log to determine how the data logs are related to each other. In this case, the distribution of correlation coefficients has about one-hundred-and-thirty near 0.6, one-hundred-and-eighty around −0.2, and one-hundred-and-eleven near 0.1. The rest of the correlation coefficients are spread throughout the −1 to 1 scale, except none are between 0.4 and 0.45. Thus, the correlation determines that a threshold to ensure highly correlated data is 0.45. All of the data logs with correlation coefficients below the threshold are filtered out, and a causal analysis is run on the remaining data logs.

In this case, Granger causal analysis is used, and it is determined that Asset_42 or Asset_237 may be the assets that are the root cause of the issue. Therefore, those assets are displayed to a user, who may then focus attention to those two assets to rectify the issue.

Figure 4:
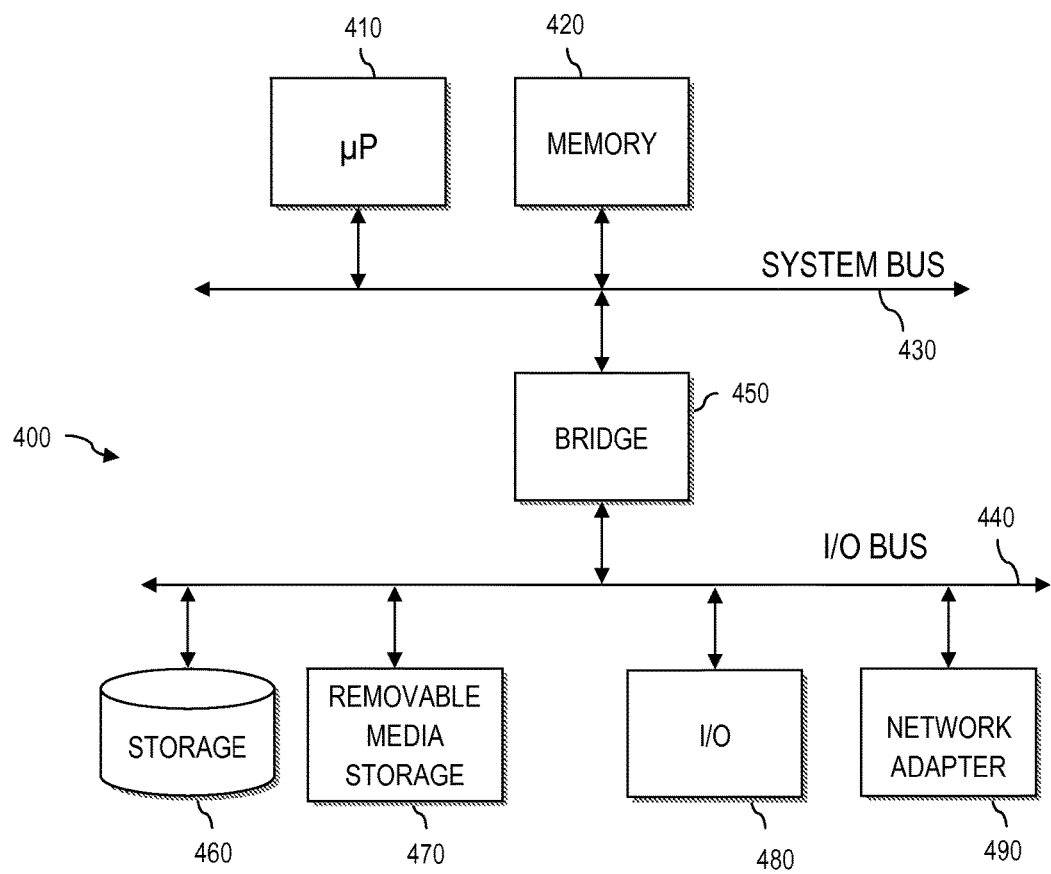
FIG. 4 is a block diagram of a computer system having a computer readable storage medium for implementing functions according to various aspects of the present disclosure as described in greater detail herein.

Referring to FIG. 4, a block diagram of a data processing system is depicted in accordance with the present invention. Data processing system 400 may comprise a symmetric multiprocessor (SMP) system or other configuration including a plurality of processors 410 connected to system bus 420. Alternatively, a single processor 410 may be employed. Also connected to system bus 420 is memory controller/cache 430, which provides an interface to local memory 440. An I/O bus bridge 450 is connected to the system bus 420 and provides an interface to an I/O bus 460. The I/O bus may be utilized to support one or more buses and corresponding devices 470, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 480, storage 490 and a computer usable storage medium 495 having computer usable program code embodied thereon. The computer usable program code may be executed to implement any aspect of the present invention, for example, to implement any aspect of any of the methods and/or system components illustrated in FIGS. 1-3.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A system for determining a root cause of an issue in an enterprise, the system comprising:
   a processor coupled to memory with an executable program stored thereon, wherein the program instructs the processor to implement:
      a log reader that receives data logs as unstructured data from a plurality of assets in the enterprise and converts the unstructured data to structured data;
      a time-series converter that identifies a time scale for each data log, determines a common time scale based on the identified time scales, and converts the data logs to the common time scaled time series;
      a correlator that filters out data logs that do not contribute to a causal analysis to determine the root cause of the problem in the enterprise; and
      a causal engine that performs the causal analysis using the data logs that were not filtered out to determine the root cause of the problem in the enterprise.

2. The system of claim 1, wherein the log reader converts the unstructured data to structured data by appending a name of an asset from the plurality of assets that supplied the unstructured data to the log reader and identifying timestamps in the data log that indicate the time scale of the time series.

3. The system of claim 1, wherein the log reader receives data logs from the plurality of assets in the enterprise, wherein the enterprise is a heterogeneous network.

4. The system of claim 3, wherein the log reader receives data logs concerning hardware, software, and databases.

5. The system of claim 1, wherein the time-series converter determines the common time scale by determining a largest time scale among the data logs and the time-series converter converts the time scales of each data log to the largest time scale.

6. The system of claim 1, wherein the correlator reduces a hypothesis space of combinations for the causal engine to perform the causal analysis.

7. The system of claim 1, wherein the correlator filters out data logs that do not contribute to a causal analysis by:
   creating a list of the data logs converted to the common time scale;
   selecting a first data log from the list;
   performing until each data log in the list is associated with a correlation coefficient for each other data log in the list:
      determining correlation coefficients for the selected data log by comparing the selected data log to each other data log in the list; and
      selecting a next data log in the list; and
   filtering out all data sets from the list that are associated with a correlation coefficient below a threshold.

8. The system of claim 7, wherein the threshold is determined though through a statistical analysis of the correlation coefficients.

9. The system of claim 1, wherein the causal engine uses unsupervised learning to determine the root cause of the problem in the enterprise.

10. The system of claim 1 further comprising an output module that sends the determined root cause to a graphical user interface for display to a user.

11. A process for determining a root cause of a problem in an enterprise, the process comprising:
   receiving data logs as unstructured data from a plurality of assets in the enterprise;
   converting the unstructured data to structured data;
   identifying a time scale for each data log;
   determining a common time scale based on the identified time scales;
   converting each data log to the common time scale;
   correlating the data logs to filter out data logs that do not contribute to a causal analysis to determine the root cause of the problem in the enterprise; and
   performing the causal analysis using the data logs that were not filtered out to determine the root cause of the problem in the enterprise.

12. The process of claim 11, wherein converting the unstructured data to structured data further comprises:
   appending a name of an asset from the plurality of assets that supplied the unstructured data to the log reader; and
   identifying timestamps in the data log that indicate the time scale of the time series.

13. The process of claim 11, wherein receiving data logs from the plurality of assets in the enterprise further comprises receiving data logs from a plurality of assets in a heterogeneous enterprise.

14. The process of claim 13, wherein receiving data logs further comprises receiving data logs concerning hardware, software, and databases.

15. The process of claim 11, wherein:
   determining the common time scale further comprises determining a largest time scale among the data logs; and
   converting each data log to the common time scale further comprises converting the time scales of each data log to the largest time scale.

16. The process of claim 11, wherein filtering out data logs that do not contribute to a causal analysis further includes reducing a hypothesis space of combinations for the causal analysis.

17. The process of claim 11, wherein filtering out data logs that do not contribute to a causal analysis further includes:
   creating a list of the data logs converted to the common time scale;
   selecting a first data log from the list;
   performing until each data log in the list is associated with a correlation coefficient:
      determining a correlation coefficient for the selected data log by comparing the selected data log to each other data log in the list; and
      selecting a next data log in the list; and
   filtering out all data sets from the list that are associated with a correlation coefficient below a threshold.

18. The process of claim 17, wherein filtering out all data sets from the list that are associated with a correlation coefficient below a threshold further includes filtering out all data sets from the list that are associated with a correlation coefficient below a threshold determined through a statistical analysis of the correlation coefficients.

19. The process of claim 11, wherein performing the causal analysis further comprises using unsupervised learning to determine the root cause of the problem in the enterprise.

20. Computer-readable hardware with program code stored thereon, wherein the program code instructs a hardware processor to perform:
   receiving data logs as unstructured data from a plurality of assets in the enterprise;
   converting the unstructured data to structured data;
   identifying a time scale for each data log;
   determining a common time scale based on the identified time scales;
   converting each data log to the common time scale;
   correlating the data logs to filter out data logs that do not contribute to a causal analysis to determine the root cause of the problem in the enterprise; and
   performing the causal analysis using the data logs that were not filtered out to determine the root cause of the problem in the enterprise.

* * * * *